United States Patent
Deliwala

(10) Patent No.: US 7,218,799 B2
(45) Date of Patent: May 15, 2007

(54) EXTERNAL OPTICAL MODULATOR

(75) Inventor: Shrenik Deliwala, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 75 days.

(21) Appl. No.: 11/092,450

(22) Filed: Mar. 29, 2005

(65) Prior Publication Data

US 2006/0222281 A1    Oct. 5, 2006

(51) Int. Cl.
*G02F 1/295* (2006.01)
*G02F 1/01* (2006.01)
*G02F 1/035* (2006.01)
*G02B 6/26* (2006.01)
*G02B 6/10* (2006.01)
*G02B 6/42* (2006.01)

(52) U.S. Cl. ............... 385/8; 385/1; 385/2; 385/4; 385/14; 385/39; 385/40; 385/129; 385/130; 385/131; 385/132

(58) Field of Classification Search ............ 385/1, 385/2, 3, 14, 39, 40, 41, 42, 129, 130, 131, 385/132, 4, 8
See application file for complete search history.

(56) References Cited

U.S. PATENT DOCUMENTS 3,958,862 A * 5/1976 Scibor-Rylski .......... 359/261
5,418,871 A * 5/1995 Revelli et al. ........... 385/44
5,825,524 A   10/1998 Faderl et al. ............ 359/245
5,835,646 A * 11/1998 Yoshimura et al. ...... 385/14
6,885,781 B2* 4/2005 Glebov et al. ........... 385/8
2003/0035614 A1* 2/2003 Glebov et al. ........... 385/21
2004/0022492 A1   2/2004 Gunther et al. .......... 385/40
2004/0202398 A1  10/2004 Boissier et al. .......... 385/11
2006/0222281 A1* 10/2006 Deliwala ................. 385/8

FOREIGN PATENT DOCUMENTS

EP    0065327    11/1982    ......... 385/14 X

OTHER PUBLICATIONS

Reed et al., "Silicon Optical Modulators" Materials Today, Elsevier Science, Kidlington, GB, vol. 8, No. 1, Jan. 2005, pp. 40-50.
"Physical Structure of Lithium Niobate Thin Films," Rost et al., *IEEE Transactions on Ultrasonics, Ferroelectrics, and Frequency Control*, vol. 38, N. 6 (Nov. 1996).
"A Review of Lithium Niobate Modulators for Fiber-Optic Communications Systems," Wooten et al., *IEEE J. of Selected Topics in Quantum Electronics*, vol. 6, N. 1 (Jan./Feb. 2000).
"Silicon Optical Modulators," Reed et al., *Materials Today*, ISSN: 1369 7021 (Jan. 2005).

* cited by examiner

*Primary Examiner*—Brian M. Healy
(74) *Attorney, Agent, or Firm*—Gauthier & Connors LLP

(57) ABSTRACT

An optical modulator structure includes a block that includes electro-optical (EO) materials. A waveguide and electrode structure is formed on a substrate. The block is in close proximity to the waveguide and electrode structure so as to form optical modulation when electric fields in the block are varied.

36 Claims, 4 Drawing Sheets

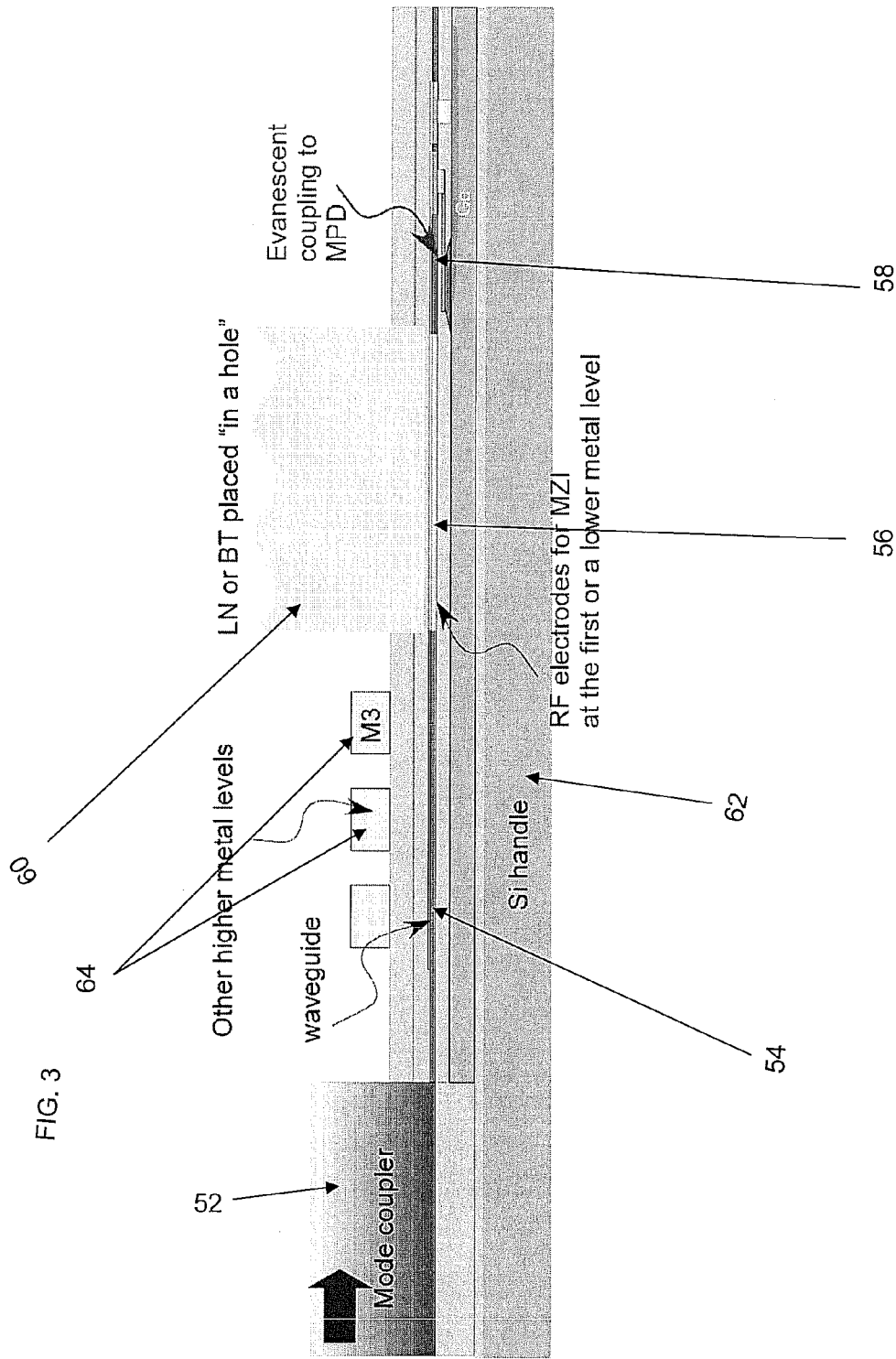

EXTERNAL OPTICAL MODULATOR

BACKGROUND OF THE INVENTION

The invention relates to the field of optical modulators, and in particular to external electro-optical (EO) modulators.

There are many different modulator technologies that are now in use. Various physical effects are used to modulate light beam: acousto-optic, electro-optic, electro-absorption, plasma density, thermo-optic, etc. High-speed optical communications are dominated by either direct modulation of the laser source or integrated/hybrid modulator. The most popular external modulators are based on electro-absorption (EA) in multi-quantum well materials or electro-optic effect in $LiNbO_3$ (LN). EA modulators often require temperature control for proper operation and although they operate with low power, they have not proven cost-effective. LN modulators have excellent modulation specs, but are power-hungry and large.

There is no commercially available solution that allows seamless integration of large number of optical modulators to be used with electronics to tackle various tasks, from digital communications to analog optical signal processing. Much effort has been directed in recent years on plasma based silicon modulators that can be potentially integrated with electronics. The optical and electronic process requirements for fully integrated modulators are quite onerous and make it very difficult to adapt electronics and optics to ever-changing market needs and to take advantage of new process and material technologies.

SUMMARY OF THE INVENTION

According to one aspect of the invention, there is provided an optical modulator structure. The optical modulator structure includes a block that includes electro-optical (EO) materials. A waveguide and electrode structure is formed on a substrate. The block is in close proximity to the waveguide and electrode structure so as to form optical modulation when electric fields in the block are varied.

According to another aspect of the invention, there is provided a method of performing optical modulation. The method includes providing a block that includes electro-optical (EO) materials. A waveguide and electrode structure is formed on a substrate. Also, the method includes producing optical modulation by placing the block in close proximity to the waveguide and electrode structure.

According to another aspect of the invention, there is provided a method of performing optical modulation. The method includes providing a block that includes electro-optical (EO) materials. A waveguide and electrode structure is formed on a substrate. Also, the method includes producing optical modulation by placing the block in close proximity to the waveguide and electrode structure. Furthermore, the method includes varying electric fields in the block.

BRIEF DESCRIPTION OF THE DRAWINGS

FIG. 3 is a schematic diagram illustrating another embodiment of the invention;

DETAILED DESCRIPTION OF THE INVENTION

The invention is described as an external electro-optical (EO) modulator using conventional EO materials such as $LiNbO_3$ (LN). The concept can be easily adapted to any thin film materials such as $BaTiO_3$ (BT), SBN, Lithium Tantalate, or the like. Even polymer organic materials may be used. The basic idea consists of manufacturing a silicon device containing RF electrodes for the modulator, waveguide, with optional integrated drive electronics, but without the EO material.

All the critical alignment and small geometry required for modulation are provided by the lithographically manufactured waveguides and RF electrodes on an integrated silicon platform. Thus, many electro-optic materials that may be incompatible with the standard silicon fabrication sequence may be used for providing the optical modulation function. This type of integration allows electrical design flexibility as well as optical material choice. As better optical materials become available, modulator designs can be improved without substantially changing the silicon fabrication processes.

Figure 1A:
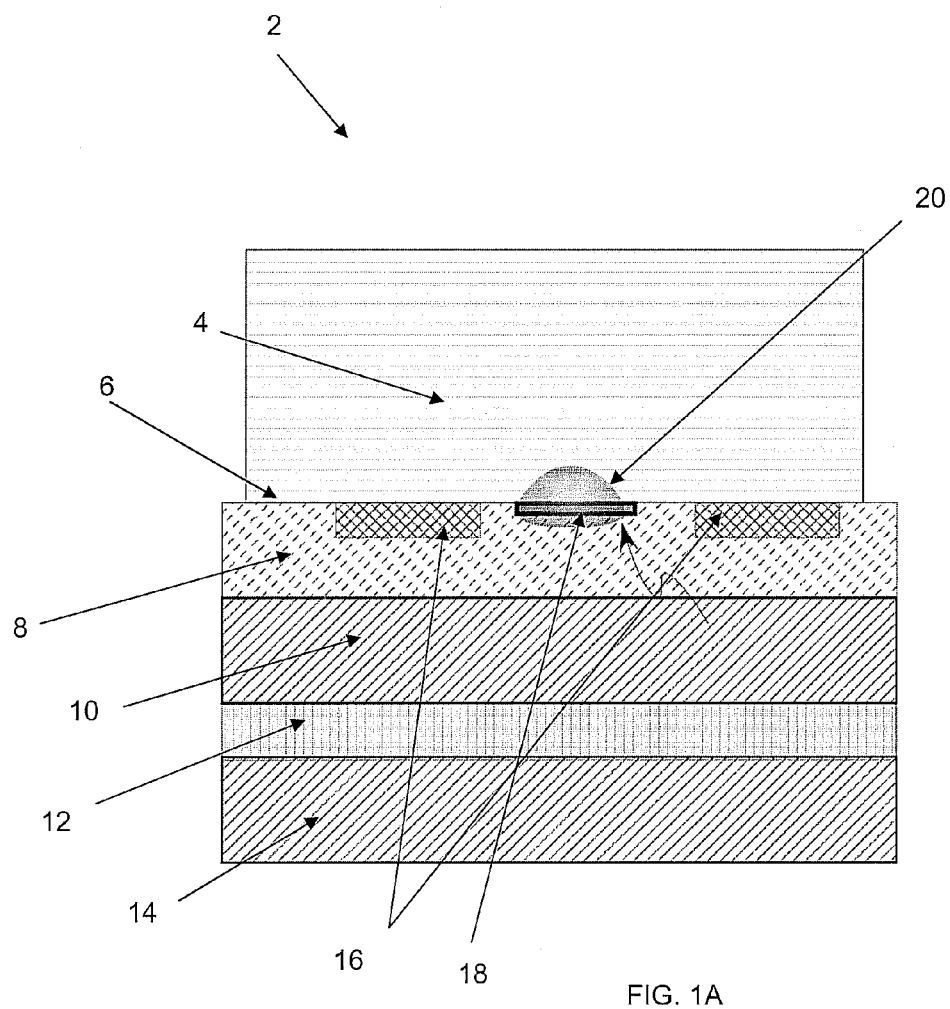
FIGS. 1A–1B are schematic diagrams illustrating a modulator device in accordance with the invention.

FIG. 1A shows an EO modulator 2 formed in accordance with the invention. A block 4 of un-patterned EO material is placed on a silicon die 5, which can include electronic circuits. The metal lines 16 provide the electric field to drive the EO modulator 2. The output of the electronic circuits can drive on-chip RF transmission lines such as 16 between which is sandwiched an optical waveguide 18 as shown FIG. 1A. The region 20 comprises EO materials, such as BT, LN or the like, that covers the waveguide 18, and is significant because it aids in the optical modulation. The light in the waveguide is propagating either in or out of the plane of the figure. The interlayer dielectric (ILD) layer 8 is formed on a Si device layer 10, and the Si device layer 10. The diagram here shows a SOI wafer with the buried oxide layer 12 and the silicon handle 14.

It is important to note that one need not imagine the RF lines 16 and waveguides 18 formed on the first metal level but any convenient metal level. Furthermore, the RF guide and the waveguides are formed on one silicon wafer while EO block is simply positioned in proximity to allow modulation. In this case, the modulator material forms the cladding of the waveguide and becomes integral part of the waveguide design. Here the electric field applied through electrodes 16 acts on the EO material and modulates the index of the cladding material which in turn changes the effective index or the propagation constant of the waveguide. The modulator material itself is either bonded or placed in proximity.

Figure 1B:
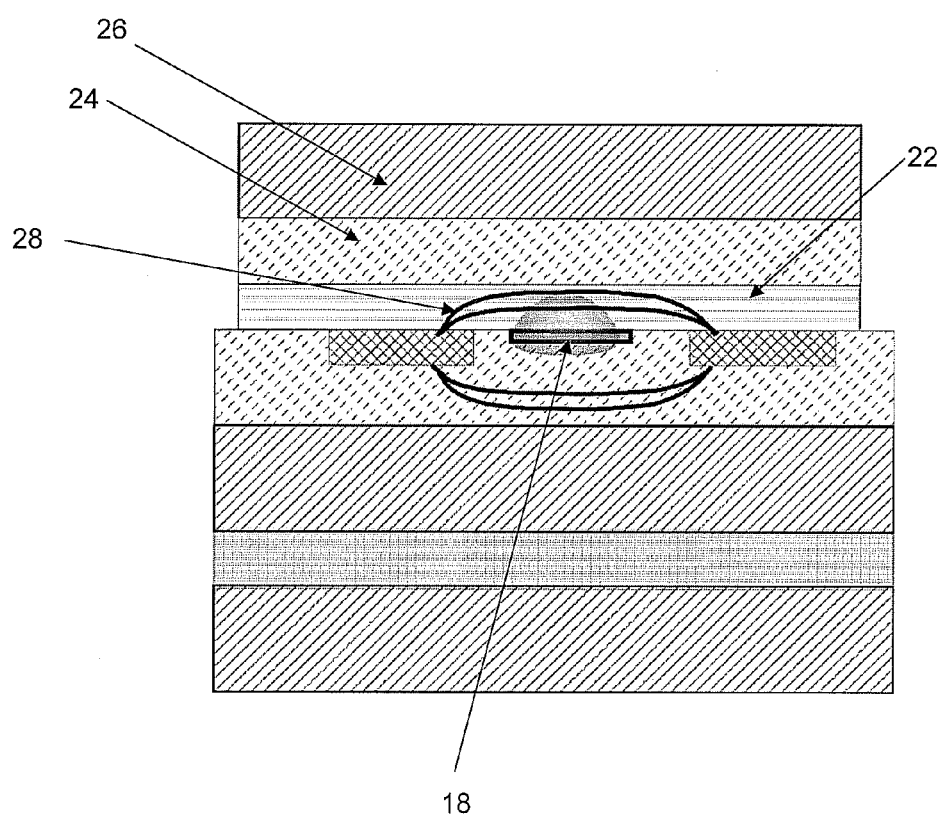

In FIG. 1B, the block of EO material is replaced with a "thin" un-patterned film of EO material 22. An un-patterned thin film EO material 22 is shown deposited on or bonded to a suitable handle such as silicon. The EO material and the silicon handle (not limited to silicon as handle) may be separated by a spacer Layer which may be present either for the purpose for confining the light beam to the modulator material or for growth of EO films. The difference between FIG. 1A and FIG. 1B is that the bulk material 4 in FIG. 1*a* has been replaced by a thin-film 22 in FIG. 1B. In this case, the modulator material 22 can even act as the waveguide care itself with the film layer 24 providing the cladding. The cladding layer 24 may serve multiple purposes. This is best illustrated by examples. A material such as barium titanate (BT) has been grown on silicon with MgO as a buffer layer. In this case, MgO can both act as a "upper cladding" for the new combined waveguide including the waveguide 18 and the EO material 22. One can also use ion-slicing or smart-cut techniques to prepare a slice of LN in which layer 24 may be made from glass to promote bonding to the silicon handle 26. The electric fields generated are illustrated by field lines such as 28 which is responsible for change in the refractive index of the EO material.

Thus, with the aid of the above diagram it is clear that two separately constructed "wafers" or "die"—one consisting of waveguides, RF electrodes, and an optional transistor circuit for driver and the other only an unpatterned EO material will allow for construction of an optical modulator.

This is different than the present practice of construction of optical modulators in which waveguides and electrodes are deposited or constructed as part of the modulator. In case of LN modulators, waveguide is defined in LN (e.g. with diffusion of Titanium) and electrodes deposited. The electronic driver is a separate component. In case of electroabsorption modulators constructed form III–V materials, the waveguide and the electronic device construction are in the material system itself.

Figure 2:
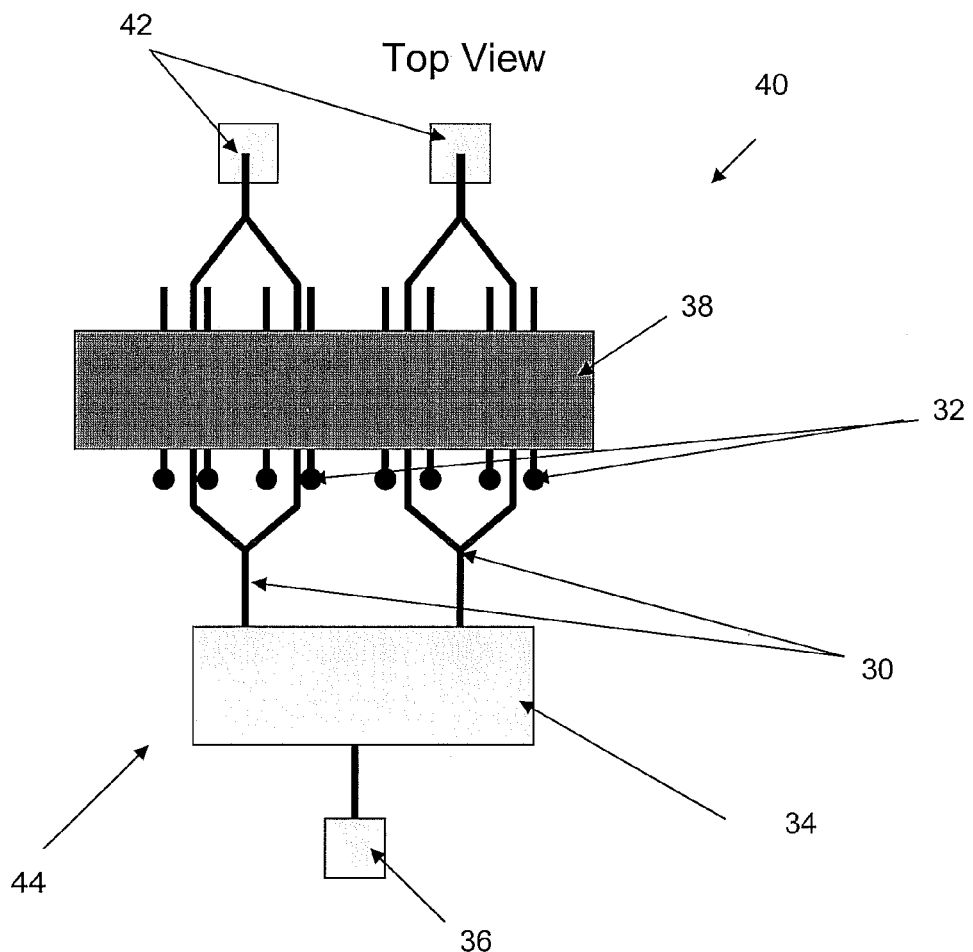
FIG. 2 is a graph demonstrating the optical field from a poly-silicon waveguide used in accordance with the invention.

The modulator constructed using the techniques disclosed here may take many different forms. It could be a Mach-Zhander type interferometric intensity modulator 44 as shown in FIG. 2. In this case, a single block of EO material 38 is shown (as in FIG. 1A or 1B) placed across multiple waveguides 30 and RF structures, such as the metal electrodes 32, power splitter 34, input coupler 36, and output couplers 42. Note the device is formed on a Si substrate 40. FIG. 2 shows how multiple modulators can be constructed from the same source with the waveguides defined in the silicon electronics providing all of the optical passive functionality.

The passive waveguides 30 on the substrate 40 can include optical coupling structures 36, 42 so as to increase the efficiency of transfer of optical light in the waveguide as it traverses from the EO material free region to under the EO material region 38. These structures can include geometrical as well as index tapers.

The modulator 44 can include ring resonators whose resonance is shifted by the proximate EO material 38, or X-switches. In fact many of the traditional devices such as arrayed waveguide gratings can be made "active" by constructing them with waveguides 30 and metal electrodes 32. A single EO block 38 can then be used for all of the modulation functions.

Another advantage of this technique is the freedom to choose optimal electrical and optical materials. The electronic processes that include waveguides can be chosen specifically for a given task—bipolar, CMOS etc and the circuits and fabrication processes improved independent of the EO materials. The EO material itself can be chosen to have specific properties for various wavelength ranges of interest.

Yet another advantage of the above invention is the improvement in some important aspects of modulator performance. By placing RF power carrying metal lines in very close proximity (<few μm) and defined directly by lithography, a voltage swings of a few volts or even a fraction of a volt can produce relatively strong electric field. This directly reduces the modulator length. Thus, even when using conventional materials such as LN, a factor of ten or more increase in the electric field is achieved by shrinking waveguide dimensions from 10 μm (typical) to approximately 1 μm. This proportionately reduces the modulator length. Many of the EO materials have high dielectric constants which make the velocity matching between RF and optical fields difficult. By using thin EO materials as in FIG. 1B, the effective dielectric constant is reduced substantially. Of course decrease in the modulator length makes it easy to either ignore velocity matching issues or make it easier.

Basic consideration of the RF strip-line design suggest that very reasonable transmission lines can be made on the chip with losses in the neighborhood of few dB/mm. Also, with the driver circuit on the substrate, one can imagine multiple potential solutions. For a very short modulator, one can treat the electrodes as a lumped element. One can also choose to use multiple output stages to segment a long electrode into a smaller "lumped" element sections. Furthermore, one can use phase delay to these various sections to better match the velocity of the optical wave in the optical waveguide.

The choice of the waveguide material may depend on many considerations. These include EO material, location in the metal stacks on the electronic chip, wavelength range etc. For example, if needs to use a bulk EO material such as shown in FIG. 1A, the waveguide index must be greater than the EO material index. In case of LN or BT the index is in the range of 2.2. This means that polysilicon may be most suitable or readily available material for fabrication in an IC manufacturing since its index is 3.5. The thickness of the polysilicon waveguide is chosen so that substantial amount of evanescent field may penetrate the EO material to improve modulation efficiency. If for some reason, the polysilicon needs to be deposited before multiple metal layers (since it needs to be typically deposited at higher temperatures than what metals can withstand) than the modulator 60 may need to be placed in a "hole" as shown in FIG. 3.

FIG. 3 shows an on chip external fiber to the waveguide coupler 52 and an evanescently coupled detector 58 all integrated on the electronic substrate 62 containing waveguide 54 and RF electrodes 56. The modulator 60 itself is placed in close proximity with the waveguide 54 at the lower metal level.

In case of thin LN or BT EO films or for some organic polymers, silicon nitride based waveguides may be used and the waveguide may be located at any convenient metal level 64.

Calculations suggest that with a 0.7 micron waveguide and 1.5 micron spacing between the RF electrodes, $L_{mod}=2$ mm is possible with drive voltage of ±0.5 V for an EO material with electro-optic coefficient of approximately 30 pm/V such as LN.

Note also that the modulator can be made "serpentine" with appropriate RF delay geometry to make it far more compact. This is because the underlying poly waveguide can support very tight bend radius.

A large number of modulator architectures can now be implemented using this technology. The waveguide on the chip define the function and the electrodes with EO material define the dynamic behavior. Since the EO effect consumes no static power, functions such as optical add-drop and switching will have tremendous power saving when compared to thermally tuned architectures. Examples include, but are not limited to: resonances of a planar ring waveguides can be tuned, optical switching function using either an MZI or X-switch structure—at high speed this is a modulator, at lower speed it is a 1X2 switch using traditional definition, and use as tunable section for an externally tuned laser cavity.

One can use the advantage offered by lithography and device integration to provide small waveguide dimensions, local driver electronics, built-in detectors for feedback control while leveraging EO material technology. Since many of the EO materials are exotic, patterning and etching them often involve significant process development. They are also difficult to integrate with IC making fabrication processes. As disclosed herein, one can circumvent both of these very difficult challenges and at the same time improved on size and power.

The concepts laid out here do not in any way preclude thin-film materials. For example a BT thin film on silicon handle is equally suitable if not more so. A thin BT film with glass as a buffer layer will allow us to truly use BT as a core of the waveguide 18 and improve modulation efficiency. This invention enables the use of more compact geometries such as folded waveguides, multiple output stages, active matching of RF to optical velocities by using segmentation. This in turn can allow the modulator to be folded and thus a compact polymer modulator can be made. Typically, polymer modulators have a length of approximately a few centimeters and they are designed as long-thin modulators.

The invention also allows one to use transceivers with higher operating temperature since it is lot easier to operate a CW laser at higher temperature than a directly modulated one, and is easily extensible to array of modulators either operating at the same wavelength or operating at multiple wavelengths. Moreover, the invention allows for both phase and amplitude modulation as well as more complex coding formats by the design of the optical waveguide structures and electrode patterns in conjunction with electronic driver circuits. Furthermore, the inventive modulator can be adapted to many different kinds of IC manufacturing platforms.

Although the present invention has been shown and described with respect to several preferred embodiments thereof, various changes, omissions and additions to the form and detail thereof, can be made therein, without departing from the spirit and scope of the invention.

What is claimed is:

1. An optical modulator structure comprising:
   a block that includes electro-optical (EG) materials; and
   a waveguide and electrode structure that is formed on a substrate; said block is in close proximity to said waveguide and electrode structure so as to form optical modulation when electric fields in said block are varied, said electrode structure comprising a plurality of metal RF lines providing the electric fields to drive said block.

2. The optical modulator structure of claim 1, wherein said EO materials comprise $LiNbO_3$ (LN).

3. The optical modulator structure of claim 1, wherein said EO materials comprise $BaTiO_3$ (BT), SBN, or Lithium Tantalate.

4. The optical modulator structure of claim 1, wherein said EO materials comprise polymer organic materials.

5. The optical modulator structure of claim 1 further comprising a Si device layer.

6. The optical modulator structure of claim 1, wherein said block is formed on a silicon die that comprises electronic circuits for driving said optical modulator.

7. The optical modulator structure of claim 1, wherein said waveguide and electrode structure comprises poly-silicon.

8. The optical modulator structure of claim 1, wherein said waveguide and electrode structure comprises a SiON or silicon nitride waveguide.

9. The optical modulator structure of claim 1, wherein said waveguide and electrode structure comprises a high index waveguide.

10. The optical modulator structure of claim 1, wherein said optical modulation is induced by variation in the electric fields in the EO materials by varying the potential of the local electric field.

11. The optical modulator structure of claim 1, wherein said optical modulation comprises change in either amplitude, phase, or polarization state.

12. The optical modulator structure of claim 1, wherein said waveguide and electrode structure comprises passive waveguides for forming various optical elements.

13. A method of performing optical modulation comprising:
    providing a block that includes external electro-optical (EO) materials;
    forming a waveguide and electrode structure on a substrate, said electrode structure comprising a plurality of metal RF lines providing the electric fields to drive said block; and
    producing optical modulation by placing said block is in close proximity to said waveguide and electrode structure.

14. The method of claim 13, wherein said EO materials comprise $LiNbO_3$ (LN).

15. The method of claim 13, wherein said EO materials comprise $BaTiO_3$ (BT), SBN, or Lithium Tantalate.

16. The method of claim 13, wherein said EO materials comprise polymer organic materials.

17. The method of claim 13 further comprising a Si device layer.

18. The method of claim 13, wherein said block is formed on a silicon die that comprises electronic circuits for driving said optical modulator.

19. The method of claim 13, wherein said waveguide and electrode structure comprises poly-silicon.

20. The method of claim 13, wherein said waveguide and electrode structure comprises a SiON or silicon nitride waveguide.

21. The method of claim 13, wherein said waveguide and electrode structure comprises a high index waveguide.

22. The method of claim 13, wherein said optical modulation is induced by variation in the electric fields in the EO materials by varying the potential of the local electric field.

23. The method of claim 13, wherein said optical modulation comprises change in either amplitude, phase, or polarization state.

24. The method of claim 13, wherein said waveguide and electrode structure comprises passive waveguides for forming various optical elements.

25. A method of performing optical modulation comprising:
    providing a block that includes external electro-optical (EG) materials; and
    forming a waveguide and electrode structure on a substrate, said electrode structure comprising a plurality of metal RE lines providing electric fields to drive said block; and
    placing said block is in close proximity to said waveguide and electrode structure; and
    varying the electric fields in said block using said RE metal lines.

26. The method of claim 25, wherein said EO materials comprise $LiNbO_3$ (LN).

27. The method of claim 25, wherein said EO materials comprise $BaTiO_3$ (BT), SBN, or Lithium Tantalate.

28. The method of claim 25, wherein said EO materials comprise polymer organic materials.

29. The method of claim 25 further comprising providing a Si device layer.

30. The method of claim 25, wherein said block is formed on a silicon die that comprises electronic circuits for driving said optical modulator.

31. The method of claim 25, wherein said waveguide and electrode structure comprises poly-silicon.

32. The method of claim 25, wherein said waveguide and electrode structure comprises a SiON or silicon nitride waveguide.

33. The method of claim 25, wherein said waveguide and electrode structure comprises a high index waveguide.

34. The method of claim 25, wherein said optical modulation is induced by variation in the electric fields in the EO materials by varying the potential of the local electric field.

35. The method of claim 25, wherein said optical modulation comprises change in either amplitude, phase, or polarization state.

36. The method of claim 25, wherein said waveguide and electrode structure comprises passive waveguides for forming various optical elements.

* * * * *